(12) United States Patent
Turner

(10) Patent No.: US 7,117,749 B2
(45) Date of Patent: Oct. 10, 2006

(54) ELECTROMAGNETIC FLOW METER FOR LOW CONDUCTIVITY FLUIDS

(75) Inventor: Roger Bryson Turner, Gloucestershire (GB)

(73) Assignee: ABB Limited, (GB)

( * ) Notice: Subject to any disclaimer, the term of this patent is extended or adjusted under 35 U.S.C. 154(b) by 0 days.

(21) Appl. No.: 10/871,268

(22) Filed: Jun. 18, 2004

(65) Prior Publication Data
US 2005/0109120 A1   May 26, 2005

(51) Int. Cl.
*G01F 1/58* (2006.01)

(52) U.S. Cl. .................................. 73/861.12

(58) Field of Classification Search ............... 73/861, 73/861.12, 861.08
See application file for complete search history.

(56) References Cited

U.S. PATENT DOCUMENTS

| | | | | |
|---|---|---|---|---|
| 3,839,912 A | * | 10/1974 | Schmoock et al. | 73/861.12 |
| 4,434,666 A | | 3/1984 | Hemp et al. | |
| 5,458,003 A | * | 10/1995 | Ishihara et al. | 73/861.12 |
| 5,544,532 A | * | 8/1996 | Brown | 73/861.16 |

2003/0056602 A1   3/2003   Cushing

FOREIGN PATENT DOCUMENTS

| | | |
|---|---|---|
| EP | 0660919 | 9/1992 |
| GB | 1417463 | 5/1973 |
| GB | 2403016 | 6/2003 |
| WO | 2004070323 | 1/2004 |

OTHER PUBLICATIONS

British Examination Report under Section 18(3) dated Nov. 9, 2005 in regards to corresponding British Application No. 0315271.7.

* cited by examiner

*Primary Examiner*—Harshad Patel
(74) *Attorney, Agent, or Firm*—Ohlandt, Greeley, Ruggiero & Perle

(57) ABSTRACT

An electromagnetic flow meter is disclosed which can be used to measure flow in low conductivity fluids, for example alcohol, turpentine, oil or other organic solvents. In one embodiment, the electromagnetic flow meter includes an elongate flow conduit having a direction of elongation corresponding to a direction of fluid flow, magnetic field generating means for generating a magnetic field across the flow conduit and potential sensing electrodes for sensing a potential generated by the magnetic field in a fluid flowing through the conduit. Both the field generating means and the potential sensing electrodes of the flow meter are elongate in the direction of flow.

14 Claims, 6 Drawing Sheets

ELECTROMAGNETIC FLOW METER FOR LOW CONDUCTIVITY FLUIDS

BACKGROUND OF THE INVENTION

1. Field of the Invention

The present invention relates to electromagnetic flow meters.

2. Description of Related Art

Electromagnetic flow meters have been used for many years for measuring the flow of a conductive fluid. Electromagnetic flow meters have a number of advantages over mechanical meters as they can be made relatively compact and without moving parts to wear or become damaged by inclusions within the fluid. Electromagnetic flow meters work on the principle that a magnetic field (which may be static or time-varying) induces an EMF across a moving fluid. As a practical matter however, the EMF is typically small and measuring it with practical instruments without undue sensitivity to noise is a concern.

It conveniently so happens that water-based fluids, which constitute a usefully large proportion of process fluids to be monitored, tend to have a conductivity that can be measured using an electromagnetic flowmeter of convenient dimensions. In fact, pure (demineralised) water has a relatively low conductivity and this may be problematic to measure as the impedance of a practically sized meter would be very high. However, measurement of pure water is rarely called for as practical fluids have much higher conductivities, tap water having a conductivity approximately 100 times greater than pure water and seawater having a conductivity approximately 10,000 times greater. Typical water-based process fluids have conductivities falling between the latter two. Thus, for (impure) aqueous fluids, electromagnetic flow meters can conveniently be manufactured with practical dimensions.

Non-polar, "insulating", fluids such as oil-based fluids are not conventionally considered suitable for use with electromagnetic flow meters and there are a wide variety of other metering techniques adapted for such fluids.

The reason for this can best be understood by considering typical conductivity values. Fluids such as turpentine have conductivities of the order of 2,500 times lower than that of tap water and 200,000 times lower than seawater. Alcohols typically have similar conductivities (or slightly higher) and fluids such as kerosene and oils have still lower conductivities.

Accordingly, whilst electromagnetic flowmeters have become widely used for measuring the flow of impure aqueous fluids, other techniques are indicated for "non-conductive" fluids, e.g. organic solvents, turpentine, alcohol or oil-based fluids.

BRIEF SUMMARY OF THE INVENTION

The present invention stems from an attempt by the inventors to overcome the conventional wisdom in the art that electromagnetic flow meters are fundamentally unsuited to measurement of "insulating" fluids.

The geometry of an electromagnetic flow meter is usually tightly constrained by the physical requirements of the associated pipework, which typically means that the flow meter is formed into a cylindrical pipe of the same diameter as the surrounding pipework. The measuring electrodes are typically small discs. It has been considered that changing the geometry of the pipe into a non-circular section so that, for example, the proposed electrodes are closer together might reduce the impedance. However, only a small reduction can be gained (and a significant reduction would be needed) and in any event the change in shape may cause turbulence and/or other flow problems (such as increased flow resistance) and so may not be possible or may be undesirable in many applications.

Increasing the diameter of the disc electrodes may also decrease the impedance but again only by a relatively small amount. Furthermore, as the diameter of the electrodes increases, contamination of a portion of an electrode may lead to a change in the measured potential. For this reason, it is generally considered highly desirable to keep the electrodes small in diameter. Such electrodes effectively provide a point sample of potential, which is substantially unaffected by partial contamination.

Thus, minor changes in the geometry of the meter might lead to small changes in impedance but are likely to introduce problems and so have not appeared to provide a promising route.

Acknowledging this, some alternative attempts have been made to extend the use of electromagnetic flow meters to lower conductivity fluids e.g. demineralised water. In particular, it has been suggested [V. Cushing, "*Induction flowmeter*", *Review of Scientific Instruments* (1958) Volume 29 pp 692–697] that using very high frequencies may enable readings to be taken with fluids of lower conductivity. Theoretical considerations for this approach seem encouraging. However, due to various practical problems associated with such techniques these proposals have not hitherto developed into successful practical products. Nonetheless, this remains an avenue which seems worthy of exploration and conceivably, if the practical problems could be overcome, use of high frequencies might provide a solution to the problem of measuring low conductivity fluids.

The present invention, however, is based on a different approach.

According to a first aspect, the present invention provides an electromagnetic flow meter comprising:

an elongate flow conduit having a direction of elongation corresponding to a direction of fluid flow;

magnetic field generating means for generating a magnetic field across the flow conduit;

potential sensing electrodes for sensing a potential generated by the magnetic field in a fluid flowing through the flow conduit;

characterised in that both the field generating means and the potential sensing electrodes are elongate in the direction of flow.

It should be noted that this contradicts conventional wisdom concerning flow meter design. Conventionally, it is accepted practice that the field generating means should extend axially either side of the potential sensing electrodes in a flow meter by a sufficient amount that electrical currents primarily generated as the fluid flows into and out of the field are not generated directly in the vicinity of the potential sensing electrodes. This implies that the electrodes should be significantly shorter than the coil. Furthermore, as the length of the field generating coil increases, its resistance, weight and the cost increase, as well as the overall size of the meter, so it is generally desirable to keep the coil as small as possible and effectively use point electrodes, as discussed above. It has been shown that the optimum length for a coil is slightly less than the diameter of the conduit, typically at 0.9 times the diameter of the conduit [M. K. Bevir, "*Induced Voltage Electromagnetic Flowmeters*" Phd Thesis, *University of Warwick*, 1969]. As further background, it is noted that, before this assessment of optimum coil length was commonplace, some meters may have been constructed with slightly longer coils, but still with short electrodes.

In the present invention, as will be explained further below, elongate coils are used which are deliberately beyond the conventionally accepted "optimum" length, typically longer than twice, three times, four times or in preferred embodiments even greater than five times the diameter of the conduit. References herein to conduit diameter are intended to encompass the appropriate cross-sectional distance (or geometric mean of height and width) of a non-circular conduit.

Pursuant to the invention, it has been appreciated that increasing the length of the coils has the important effect of decreasing the effective source impedance of the source of the EMF and this can reduce the effective source impedance for a low conductivity fluid to a usable level. This can surprisingly outweigh the expected disadvantage of having a longer coil than is conventionally considered optimum.

In the case of the electrodes, because of the conventional concern about electrical currents at the edges of the field and the desire to keep the field generating coil as small as conveniently possible, prior art electrodes have deliberately been kept short in the direction of flow. Although in certain cases some larger plate electrodes have been used, in particularly in non-circular conduits, it is generally preferred to use circular or square or deliberately shortened electrodes in which the length of the electrode in the direction of flow is substantially the same as or less than the electrode dimension in a direction perpendicular to the direction of flow.

In the present invention, in contrast, elongate electrodes are used which preferably have a length in the direction of flow substantially greater than the electrode dimension in a perpendicular direction, preferably at least twice and in embodiments typically as much as at least five, preferably at least ten and more preferably of the order of twenty times the perpendicular dimension.

Pursuant to the invention, it has been appreciated that increasing the length of the electrodes can significantly decrease the effective electrode impedance, by an order of magnitude, without becoming susceptible to the known problems of contamination of a portion of the electrodes associated with prior art "larger" electrodes. Preferably, the electrodes have a length in the direction of elongation of the fluid conduit at least equal to the conduit diameter (or separation of electrodes or equivalent cross-sectional dimension of a non-circular conduit). The electrodes preferably have a length similar to the length of the field generating means, preferably at least half the length of the field generating means, preferably at least three quarters, typically at least 80%, ideally of the order of 90% or more of the length of the field generating means.

Such a flow meter may be reliably capable of measuring flow in a fluid having conductivity of the order of $10^{-4}$ mhos/m or less without the requirement for specialist instrumentation and without being unduly susceptible to noise. Preferably, the flow meter further comprises an input amplifier connected to the potential sensing electrodes having an input impedance of at least $10^{12}$ ohms, more preferably of the order of $10^{15}$ ohms or more.

In a preferred embodiment, the invention provides an electromagnetic flow meter comprising an elongate flow conduit having a length along a first direction corresponding to a direction of flow through the conduit, a width in a second direction substantially perpendicular to the first direction and a height in a third direction substantially orthogonal to the first and second directions;

at least a first field generating coil positioned above the flow conduit for generating a magnetic field substantially along said third direction;

first and second potential sensing electrodes positioned at opposite sides across the conduit for sensing potential developed across the conduit width;

wherein both the field generating coil and the first and second electrodes are elongate along said first direction.

Preferably the field generating coil has a length in the first direction at least 3 times as long as the geometric mean of the height and width of the conduit. Preferably the first and second electrodes have a length in the first which is similar to, but slightly less than, the length of the field generating coil.

References to height, width, above and across are for convenience and are not intended to imply any spatial orientation.

Preferably the flow meter has a second field generating coil opposite the first field generating coil. The conduit may be circular in cross-section in which case, the height and width (and geometric mean thereof) are all equal to the diameter of the conduit. The electromagnetic flow meter preferably has an input amplifier for measuring the potential across the first and second electrodes having an input impedance of at least $10^{12}$ ohms and preferably $10^{15}$ ohms or more.

The invention further provides an electromagnetic flow meter adapted and arranged to obtain a measurement of flow of a fluid having a conductivity of the order of $10^{-4}$ mhos/m or less. The invention further provides an electromagnetic flow meter adapted and arranged to obtain a measure of flow in an oil-based fluid.

The invention further provides an oil, alcohol, turpentine or other organic fluid (preferably oil) flow meter comprising an electromagnetic flow meter having an elongate field generating means and elongate potential sensing electrodes and a high impedance input amplifier for measuring a potential generated across the fluid to derive a measure of flow therefrom.

The invention further provides a method of deriving a measure of flow of a fluid having a conductivity of the order of $10^{-4}$ mhos/m and/or an oil-based fluid, the method comprising passing the fluid through an electromagnetic flowmeter having an elongate field generating coil and elongate potential sensing electrodes and deriving a measure of flow from a potential sensed by the potential sensing electrodes using a high impedance amplifier.

BRIEF DESCRIPTION OF THE SEVERAL VIEWS OF THE DRAWINGS

An embodiment of the invention will now be described, by way of example, with reference to the accompanying drawings in which.

DETAILED DESCRIPTION OF THE INVENTION

To assist in understanding the present invention, a theoretical explanation will first be given.

A magnetic flow meter is in essence a type of M.H.D. (magneto-hydrodynamic) generator. A simple form consists of a duct, lined with an electrically insulating lining through which the fluid to be measured flows, and in operation the fluid is made to pass through a transverse magnetic field within the duct. The moving fluid creates an electric field, E in a direction perpendicular to the motion, and to the magnetic field. The strength of the electric field depends upon the velocity V, and upon the intensity of the field B. Appropriately placed electrodes are connected to electronic apparatus that measures the potential difference between them and converts this into a form that indicates the mean flow through the meter. The details of the electronic apparatus are not germane and many conventional schemes are known which may be used herein.

Figure 1:
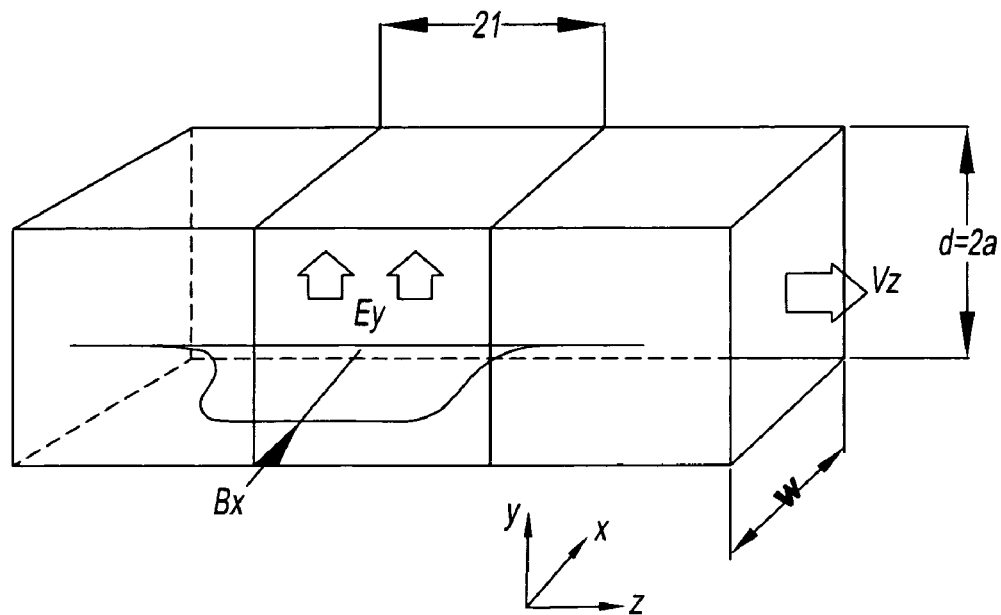
FIG. 1 is a schematic diagram of a rectangular section meter for use in explaining the theory underlying the invention.

FIG. 1 shows the layout of a simplified instrument. It has a rectangular duct of height 2a and width w. The region over which there is a transverse magnetic field extends for a length of 2l, in the direction of the flow. That is to say there is a magnetic field from z=−l to z=l. The fluid flows in the z direction with a uniform velocity $V_z$. Electrodes would normally be placed at z=0 on the top and bottom surfaces of the channel.

Figure 2:
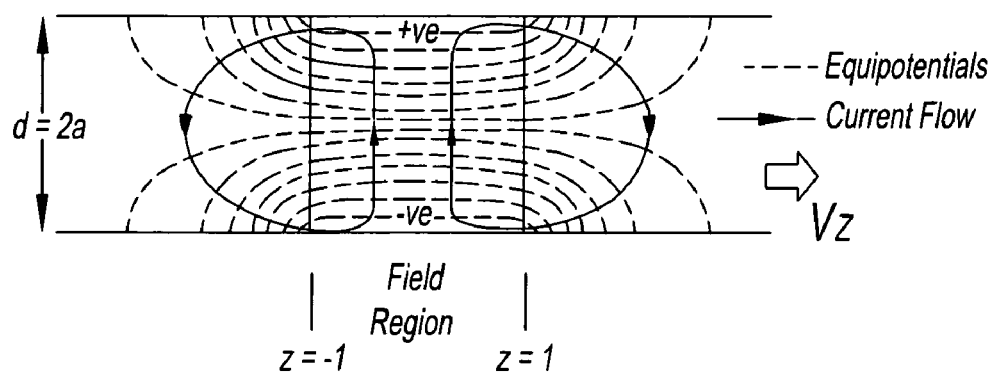
FIG. 2 is a schematic diagram of the current flow in a fluid in the meter of FIG. 1.

Currents will circulate at each end of the device where the magnetic field, and thence the induced e.m.f. die away. This is shown in FIG. 2.

Due to the circulating currents, the sensing electrodes are conventionally kept small and far from the ends of the coil, to minimize the unpredictable effects of these currents. This simple expedient simplifies conventional analysis and is normally sufficient for practical meters. However, pursuant to the invention, further analysis has been carried out, and this will now be detailed.

The equation that governs the operation of such a meter is the Ohm's law equation. In its' vector form this is $$\frac{J}{\sigma} = E + \underline{V} \times B.$$

By manipulating Ohm's law and making use of Maxwell's fourth equation we find that U, the electric potential, can be found by solving $$\nabla^2 U = -\frac{R_m}{a} \cdot \frac{\partial U}{\partial z},$$

where $R_m$ is the magnetic Reynolds a az number. The magnetic Reynolds number is a dimensionless group that is a measure of the size of the magnetic field produced by the circulating eddy currents relative to the applied field. For most liquids (with the possible exception of molten metals) and importantly for the low conductivity liquids we are considering, it is negligibly small so that we can take $\nabla^2 U=0$. This can be solved, subject to the appropriate boundary conditions.

This allows us to calculate the potential at y=±a, the top and bottom edges of the device. By differentiating these equations we can find the electric field and thence, by using Ohm's law, the current density may be found.

Figure 3:
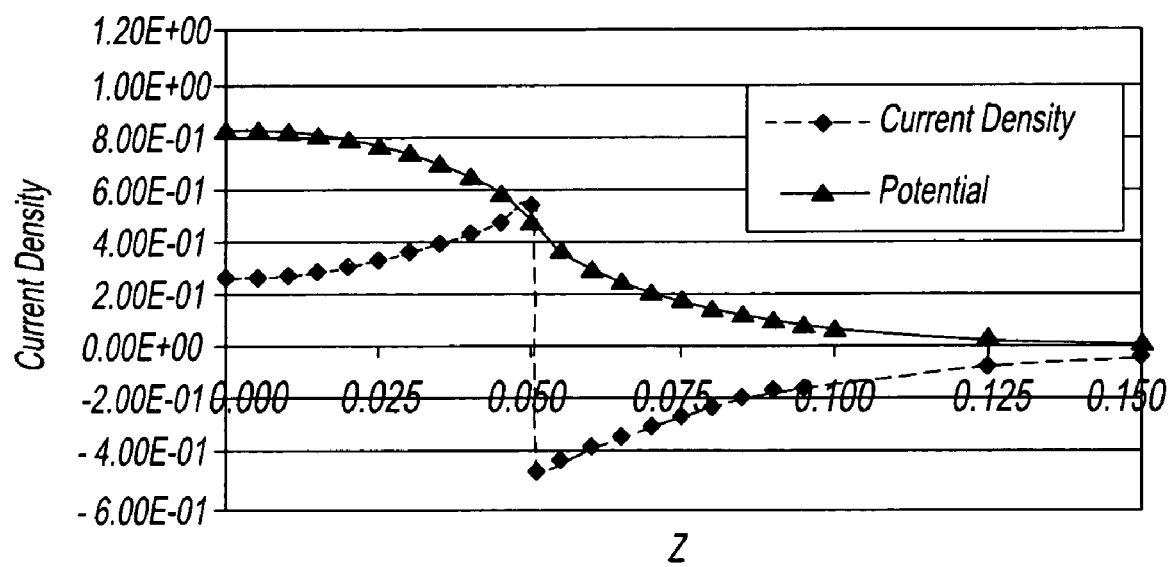
FIG. 3 is a graph of potential and current density against position in the meter of FIG. 1.

FIG. 3 shows the electrical potential on the top edge of a duct where both l and a are both 0.05 m, from z=0 to z=0.15 m. The current density at y=0 (that is to say on the axis), is also shown. This case is similar to the one shown pictorially in FIG. 2. Thus our more detailed analysis is consistent with the conventional simplification. It can be seen that current flows in a positive direction throughout the field region and returns in the other direction at the ends of the meter.

Figure 4:
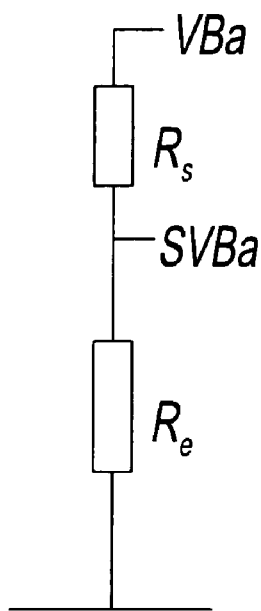
FIG. 4 schematically depicts an equivalent electrical circuit to the meter of FIG. 1.

Pursuant to the present analysis, we have treated the device as an M.H.D. generator having a source impedance $R_s$ associated with the field region and a built in load $R_e$ attributable to the circulating currents at each end. Note that, in a conventional analysis, the circulating currents are not normally considered as the electrodes are deliberately sized and placed so that the effect of the currents is minimal. The equivalent circuit is shown in FIG. 4. The input to this circuit would be $V_z B_x a$ whilst the output from the electrodes would be $S \cdot V_z B_x a$ where the sensitivity S is $$\frac{R_e}{R_e + R_s}.$$

We have used equation (1) to derive the current density within the duct and then, by integration, calculate the total current that circulates. Since we know that the maximum driving voltage is $V_z B_x a$ we have calculated the total resistance $(R_e + R_s)$ in the circuit.

Figure 5:
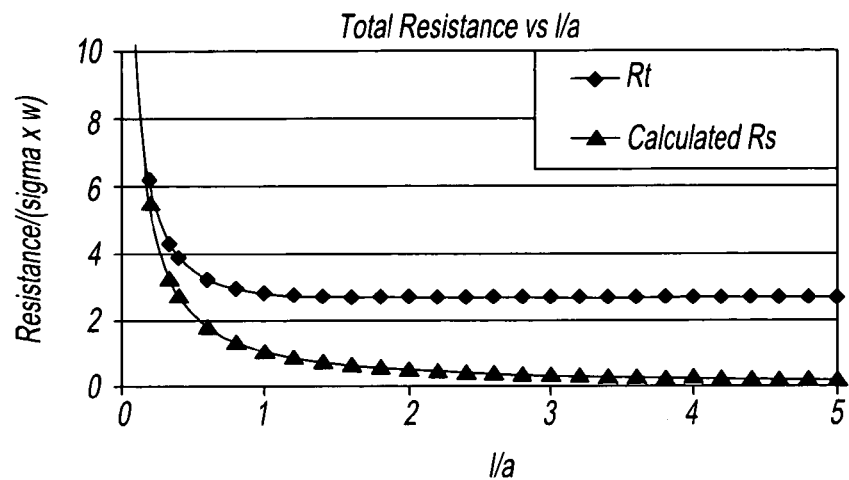
FIG. 5 is a graph of resistance against the ratio l/a of the meter of FIG. 1.

FIG. 5 shows the total resistance plotted against l/a. For short meters we anticipated that $R_s$ would be $$\frac{1}{\sigma} \cdot \frac{a}{wl}.$$

This resistance ($R_s$ based on geometry) is also shown on the graph. It can be seen that for very short meters the total resistance in the circuit tends towards this geometric value whereas as l/a becomes large the resistance becomes constant and is about $$\frac{2.691}{\sigma w}.$$

From this we have concluded that for long meters the resistance will, unlike a conventional practical meter, be solely determined by the currents that circulate at the ends of the meter (which currents do not normally feature in a conventional meter). From consideration of the equivalent circuit shown in FIG. 4 it can be seen that as $R_e$ becomes large compared with $R_s$ the sensitivity tends towards unity.

The output impedance of a conventionally arranged meter fitted with small circular "point contact" electrodes is $$\frac{1}{\sigma d}$$

Figure 6:
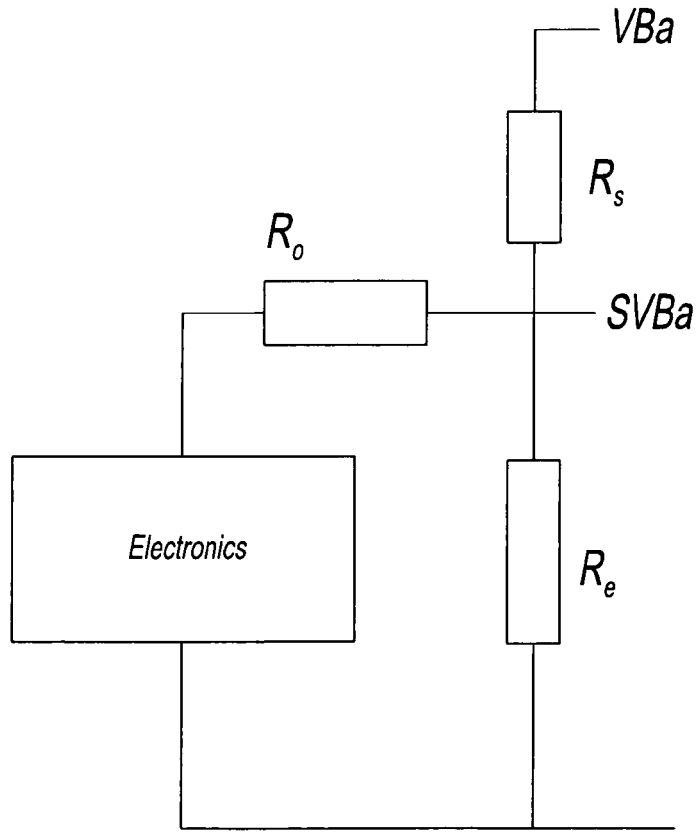
FIG. 6 schematically depicts an equivalent electrical circuit to a meter including measurement electronics.

(but we have found that $$\frac{2}{\pi \sigma d}$$

may be more accurate), where d is the diameter of the electrode. This resistance, $R_o$, appears in the equivalent circuit as shown in FIG. 6. For point contact electrodes it is much greater than $R_e$ (which is not normally considered) so that the common practice of making the input impedance of the electronics much greater than $R_o$ is satisfactory.

Figure 7:
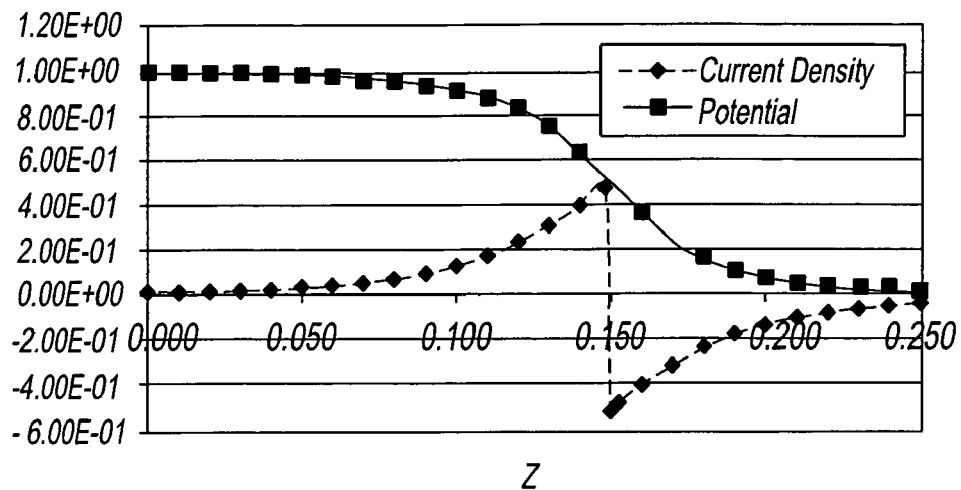
FIG. 7 shows the electric potential and the current distribution for a meter where l/a is 3.

FIG. 7 shows the electric potential and the current distribution for a meter where l/a is 3. For this instrument, and for longer meters, there is effectively no current flow at z=0 so that in the plane of the electrodes $$\frac{J}{\sigma} = 0$$

and therefore $E=-V \times B$. The sensitivity S is now unity. Eddy currents still circulate at the ends of the instrument but they no longer have any effect upon the potential at the electrodes. The equivalent circuits shown in FIGS. 4 and 6 which effectively model a conventional meter no longer have any meaning. This is because the source impedance is not meaningfully associated with the length of the field region within the meter. A surprising result we have found is that, for long meters, the output impedance is therefore dictated by the electrode geometry and the eddy currents do not cause the anticipated problems.

For meters where l/a≧3 we have therefore considered the possibility of lowering the output impedance by using a different electrode design. Whereas point contact electrodes have been in use for many years and have conventionally accepted advantages, we have considered alternatives. In a conventionally optimal meter where l/a is about 0.5, the resistance to current flow through the liquid between two such electrodes is $$\frac{2}{\pi \sigma d}.$$

If we consider the impedance between two electrodes which are semi-circular in section but are long in the direction of the flow (see FIG. 8) then we find that the resistance between them is $$\frac{2}{\pi \sigma L} \cdot \log_e \frac{2s}{b}$$

where L is half of the length of the electrode in the direction of the flow, s is the separation between the electrodes (in the case of a meter with a circular duct this is its diameter), and b is the width of the semi circular section. We have concluded that, surprisingly, we can advantageously make a meter where the field region is long and where the electrodes are about as long as the field, or L=l (approximately).

We have determined the ratio of the source impedance of this device to that of a similar one having point contact electrodes is $$\frac{2}{\pi \sigma l} \cdot \frac{\pi \sigma d}{2} \log_e \frac{2s}{b}$$

which is $$\frac{d}{l} \cdot \log_e \frac{2s}{b}.$$

The value of $$\log_e \frac{2s}{b}$$

is likely to be about 3, (for practical reasons we have explored, it cannot be less than about 2). This means that the ratio is likely to be about $$\frac{3d}{l}.$$

If d had been 8 mm and l is 0.24 m this means that $$\frac{3d}{l} = 0.1$$

or in other words the source impedance would have been reduced by an order of magnitude.

Figure 8:
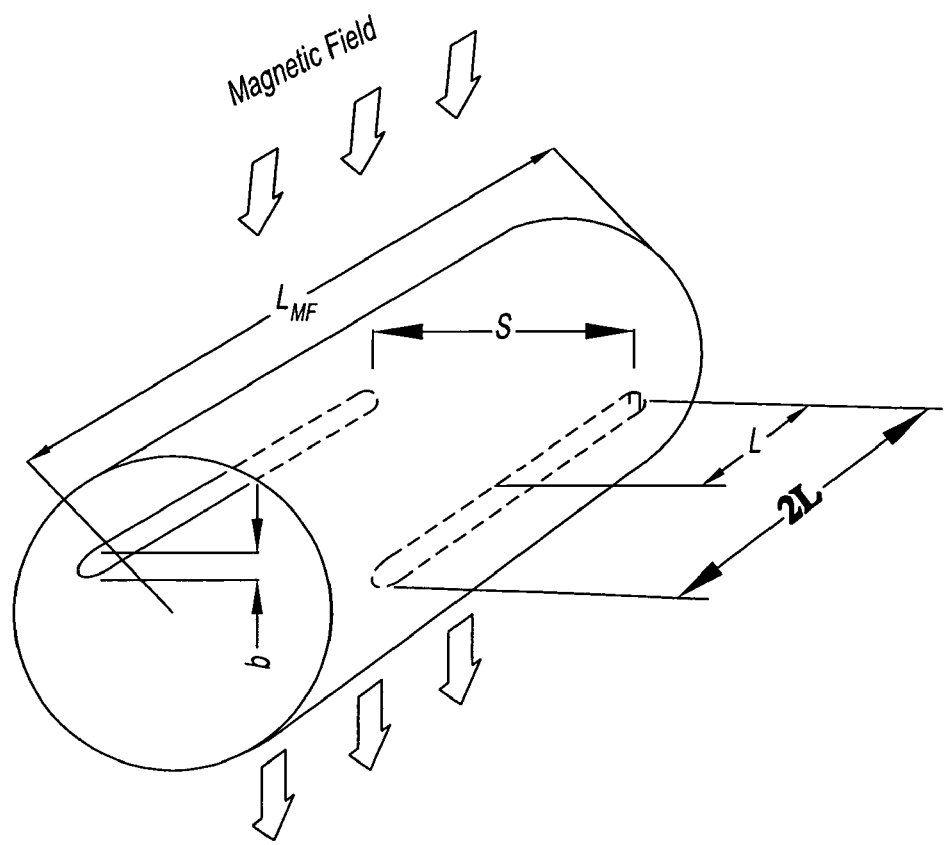
FIG. 8 shows schematically a meter with long electrodes and a cylindrical conduit in accordance with an embodiment of the invention.

In addition, FIG. 8 shows potential sensory electrodes having a first length (L) and a magnetic field generating means having a second length ($L_{MF}$). L is at least half of $L_{MF}$. L is in the direction of fluid flow and is substantially greater than b. Furthermore, L is at least equal to s.

We now consider a practical example where the fluid to be measured is an alcohol with an electrical conductivity of 0.13e-6 mhos/m (0.0013 uS/cm).

Firstly, we consider a conventional instrument having point contact electrodes 8 mm in diameter and a magnetic field that extends over a length equivalent to 0.9 times the tube diameter.

The electrode impedance for a point contact electrode is $$\frac{2}{\pi \sigma a}$$

where a is the electrode diameter and σ is the electrical conductivity of the fluid, so the electrode impedance will be $$\frac{2}{3.142 \times 0.13 e^{-6} \times 8 e^{-3}} = 612 \text{ M}\Omega.$$

Since the field extends over a length of 0.9 times the tube diameter, which in this case is 50 mm, the length of the field region will be 0.045 m and the source impedance of the magneto-hydrodynamic (MHD) generator within the meter will be about $$\left( \approx \frac{1}{\pi \sigma l} \right)$$

which is 54.7 MΩ.

Thus the total impedance is of the order of 1000 MΩ. It is difficult to measure signals with such an impedance without electrical noise causing problems. A further problem with low conductivity liquids is that minor static charges do not dissipate rapidly and will cause triboelectric noise as they pass the electrodes and, with such high impedance, this will be significant.

We now consider a novel meter in accordance with an embodiment, in which the electrodes are still 8 mm wide, but in this case the elongate electrodes are 240 mm long (30 times the height) and the magnetic field extends over a (similar) length of 270 mm. As in the conventional meter case the meter bore is 50 mm, so the electrodes and coil are about 5 diameters long.

For our novel meter the impedance between the two measuring electrodes is $$\frac{2}{\pi \sigma l} \cdot \log_e \frac{2S}{a}$$

where S is 50 mm, a is 8 mm and l is 240 mm so that $$R_e = \frac{2}{3.142 \times 0.13 e^{-6} \times 0.24} \log_e \frac{100}{8} = 51.7 \text{ M}\Omega.$$

This is approximately 12 times lower.

The source impedance of this circular MHD generator $$\left( \approx \frac{2}{\pi \sigma L} \right)$$

where L=2l will, in this case be 20.4 MΩ. This is over 6 times lower.

$$N.B. \frac{612 M\Omega}{20.4 M\Omega} = 30$$

The total impedance is of the order of 80 MΩ, an order of magnitude lower.

Thus the effect of using a long meter with elongate electrodes is that the electrode impedance and the source impedance are both significantly reduced. A further advantage we have found is that the use of long electrodes is an effective way of reducing both the flow induced noise and the electrical noise. In particular, we have concluded that small static charges may still remain in low conductivity fluids but, because the electrodes are long in the direction of flow, noise from any charges tends to average out. In a practical meter, we have found that magnetic flow meters having a field region several diameters long and which are equipped with elongate electrodes, are significantly better at measuring the flow of liquids whose electrical conductivity is low.

Figure 10:
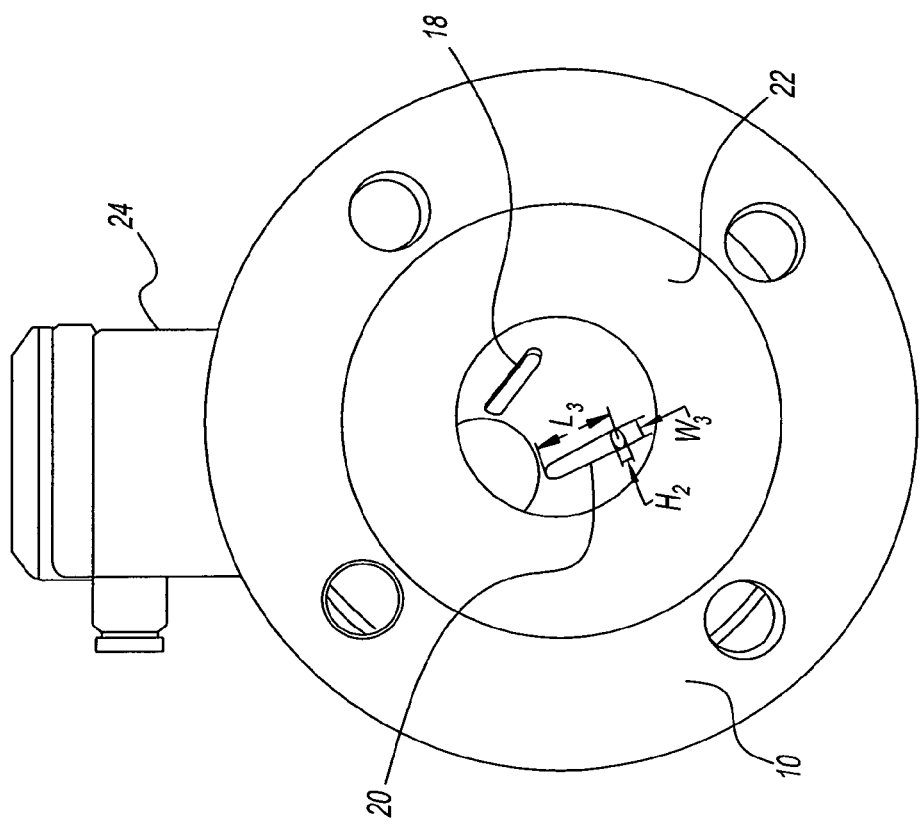
FIG. 10 is an illustration of the first embodiment showing elongate electrodes.
Figure 9:
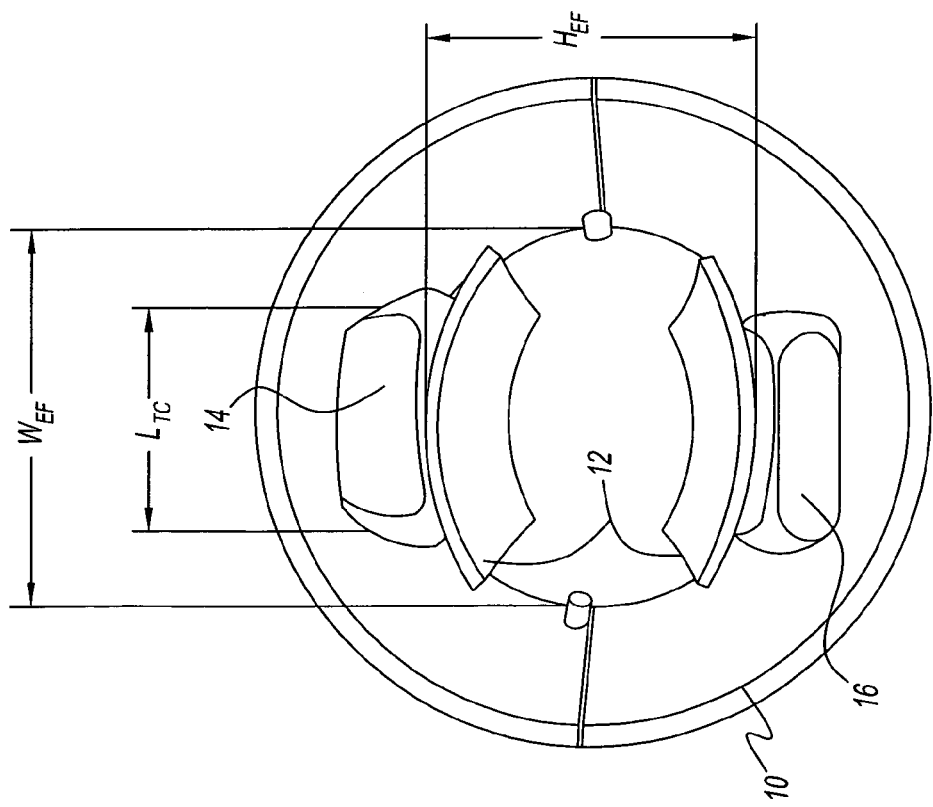
FIG. 9 is an illustration of the coil assembly of a practical meter of a first embodiment.

FIGS. 9 and 10 show an elongate fluid conduit having a width ($W_{EF}$) and height ($H_{EF}$). A first generating coil is also shown having a length ($L_{TC}$). Electrodes are also shown having a length ($L_3$), width ($W_3$), and height ($H_2$). $L_{TC}$ is at least as long as the geometric mean of $H_{EF}$ and $W_{EF}$. $L_3$ is at least as long as one-half $H_2$. Additionally, $L_3$ is at least as long as $L_{TC}$.

Figure 11:
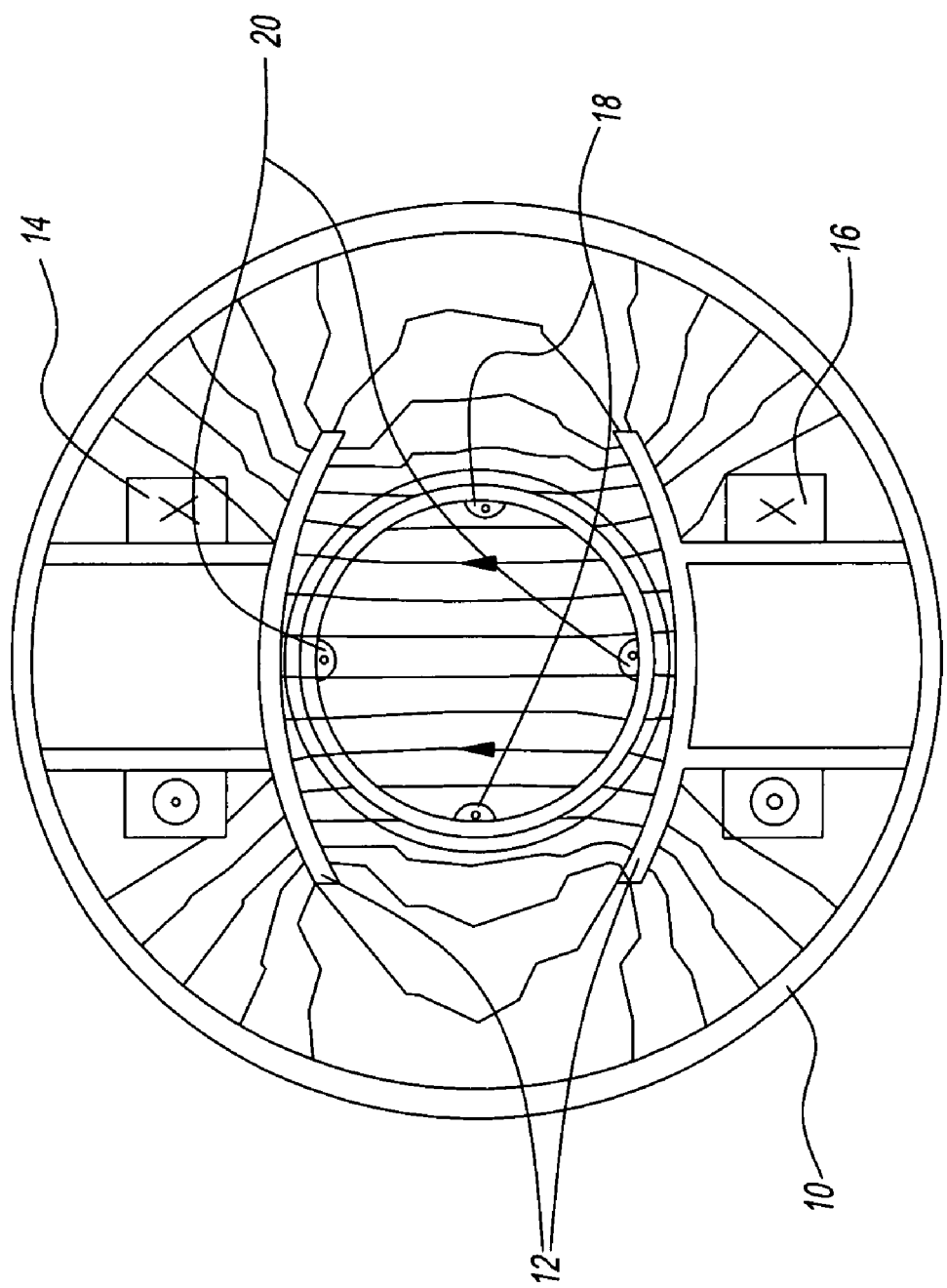
FIG. 11 is a schematic cross section of the practical meter according to the first embodiment.

Referring to FIGS. 9 to 11 a practical embodiment will now be described. A housing and magnetic return circuit 10, typically formed from steel, houses pole pieces 12, upper coil 14 and lower coil 16. The housing has an insulating lining 22, here formed from nitrile rubber, defining a bore (here 50 mm diameter) in which are provided opposed sensing electrodes 18. As shown, the coils are oriented about a vertical axis and the sensing electrodes are positioned across the horizontal diagonal although of course the spatial orientation is not critical.

Optional earthing electrodes 20 are positioned along the coil axis (where they will not pick up an induced emf due to the coil). The electrodes 18,20 and coils 14,16 are connected to metering electronics in housing 24. The metering electronics can be largely conventional and will not be described or depicted in detail. However, it is important to note that a very high impedance input amplifier should be used, preferably $10^{15}$ ohms, which can be provided by a commercially available FET input operational amplifier. As explained above, the elongate electrodes are long along the direction of flow (here 480 mm long) but of typically relatively small dimensions (here 8 mm) high (in the perpendicular dimension). The thickness of the electrodes is not critical but here they are formed as an approximately semi-circular section for structural rigidity.

Although the construction is novel, the operation of the meter is essentially conventional and will be well understood by one skilled in the art. In essence, an excitation field, typically time varying, e.g. AC or pulsed DC or a more complex scheme is applied by applying a current to the coils 14,16 and the potential induced in the moving fluid (here alcohol) is measured using a high impedance differential amplifier connected to sensing electrodes 18. After appropriate scaling and calibration, a measure of flow is obtained from the sensed potential.

The above is only an example and it can be seen that the impedance can be reduced further proportionately by extending the meter. The meter can be made very long, installed into several meters of pipe. Making the electrodes long is not problematic and a long liner can be extruded. However, making a long coil introduces some practical concerns. One solution is to extrude the pole pieces. Winding the coil around such a long pole piece cannot be done with unmodified conventional coil winding equipment but is nonetheless susceptible to automation using a moving shuttle and can of course be done manually. Alternatively, a modular coil construction may be adopted, particularly if the coil has a small number of turns which plug together—this may be acceptable if a relatively large current is passed through relatively few turns. As shown above, the electrode impedance is inversely proportional to the length of the electrode, and the source impedance of the MHD generator is inversely proportional to the length of the coil. In preferred embodiments the length of the electrode is approximately equal to the length of the coil, and thus the total impedance is approximately inversely proportional to the length of the coil. The total impedance is also inversely proportional to the conductivity of the fluid. Hence an appropriate length for the coil can be determined based on the conductivity of the fluid, in order to obtain a total impedance below a desired threshold and allow a successful flow measurement to be made. In general, a fluid with a lower conductivity will require a longer coil in a practical device. Very long coils and field regions can be produced using the techniques suggested above if required.

Although described in the context of particular examples, it will be appreciated that modifications of detail may be made and the invention is not limited to the specific embodiments. All features disclosed herein may be provided independently or in alternative combinations unless otherwise stated.

The invention claimed is:

1. An electromagnetic flow meter comprising:
   an elongate flow conduit having a direction of elongation corresponding to a direction of fluid flow;
   magnetic field generating means for generating a magnetic field across the elongate flow conduit;
   potential sensing electrodes for sensing a potential generated by the magnetic field in a fluid flowing through the elongate flow conduit;
   wherein both the magnetic field generating means and the potential sensing electrodes are elongate in the direction of fluid flow, and wherein the potential sensing electrodes have a first length and wherein the magnetic field generating means has a second length, the first length being at least half of the second length.

2. A flow meter according to claim 1 wherein the potential sensing electrodes are longer than twice a mean conduit cross-sectional dimension of the elongate flow conduit.

3. A flow meter according to claim 1 wherein the first length is in the direction of fluid flow and is substantially greater than an electrode dimension of the potential sensing electrodes in a perpendicular direction.

4. A flow meter according to claim 3 wherein the first length is in the direction of fluid flow and is at least twice the electrode dimension.

5. A flow meter according to claim 1 wherein the first length is in the direction of elongation of the elongate fluid conduit and is at least equal to a mean conduit cross-sectional dimension of the elongate flow conduit.

6. A flow meter according to claim 1 wherein the electromagnetic flow meter obtains a measure of flow in a fluid having a conductivity of the order of $10^{-4}$ mhos/m or less.

7. A flow meter according to claim 1 further comprising an input amplifier that is connected to the potential sensing electrodes and has an input impedance of at least $10^{12}$ ohms.

8. A flow meter according to claim 1, wherein the electromagnetic flow meter obtains a measure of flow in an oil-based fluid.

9. A flow meter according to claim 1, further comprising a plurality of field generating coils each having a third length, wherein the third length is greater than twice a mean conduit cross-sectional dimension.

10. An electromagnetic flow meter comprising:
    an elongate flow conduit having a length along a first direction corresponding to a direction of flow through the elongate flow conduit, a width in a second direction substantially perpendicular to the first direction, and a height in a third direction substantially orthogonal to the first and second directions;
    a first field generating coil positioned above the elongate flow conduit for generating a magnetic field substantially along said third direction; and
    first and second potential sensing electrodes having a first length and positioned at opposite sides across the elongate flow conduit for sensing potential developed across the width,
    wherein the first field generating coil has a second length in the first direction at least as long as a geometric mean of the height and the width,
    wherein the first and second potential sensing electrodes each have a third length in the first direction and a second height in the third direction, and
    wherein the third length is substantially greater than the second height and at least half the second length.

11. A flow meter according to claim 10, further comprising a second field generating coil opposite the first field generating coil.

12. A flow meter according to claim 10 wherein the elongate flow conduit is substantially circular in cross-section.

13. An oil, turpentine or organic fluid flow meter comprising;
    an electromagnetic flow meter having an elongate field generating means, elongate potential sensing electrodes, and a high impedance input amplifier for measuring a potential generated across fluid to derive a measure of flow therefrom, wherein a first length of the elongate potential sensing electrodes is at least half a second length of the elongate field generating means, and wherein the elongate field generating means and the elongate potential sensing electrodes are elongate in a direction of fluid flow.

14. A method of deriving a measure of flow of a fluid having a conductivity of the order of $10^{-4}$ mhos/m and/or an oil-based fluid, the method comprising:
    passing the fluid through an electromagnetic flow meter having an elongate field generating coil and a plurality of elongate potential sensing electrodes; and
    deriving the measure of flow from a potential that is sensed by the plurality of elongate potential sensing electrodes using a high impedance amplifier, wherein the plurality of elongate potential sensing electrodes have a first length and the elongate field generating coil has a second length, the first length being at least half the second length, and wherein the elongate field generating coil and the plurality of elongate potential sensing electrodes are elongate in a direction of fluid flow.

* * * * *